US012189952B2

(12) United States Patent
Yamamoto

(10) Patent No.: US 12,189,952 B2
(45) Date of Patent: Jan. 7, 2025

(54) STORAGE SYSTEM AND DEVICE TO MONITOR PERFORMANCE AND APPLY COUNTERMEASURES TO SMR AND NON-SMR DRIVES

(71) Applicant: BUFFALO INC., Nagoya (JP)

(72) Inventor: Yasuyuki Yamamoto, Nagoya (JP)

(73) Assignee: BUFFALO INC., Nagoya (JP)

(*) Notice: Subject to any disclaimer, the term of this patent is extended or adjusted under 35 U.S.C. 154(b) by 1 day.

(21) Appl. No.: 17/939,976

(22) Filed: Sep. 8, 2022

(65) Prior Publication Data
US 2023/0084456 A1 Mar. 16, 2023

(30) Foreign Application Priority Data
Sep. 16, 2021 (JP) .................. 2021-151527

(51) Int. Cl.
G06F 12/00 (2006.01)
G06F 3/06 (2006.01)
G11B 20/12 (2006.01)

(52) U.S. Cl.
CPC .......... *G06F 3/0611* (2013.01); *G06F 3/0653* (2013.01); *G06F 3/067* (2013.01); *G11B 20/1217* (2013.01); *G11B 2020/1238* (2013.01)

(58) Field of Classification Search
CPC ...... G06F 3/0611; G06F 3/0653; G06F 3/067; G06F 3/0634; G06F 3/0689; G06F 11/0727; G06F 11/0793; G06F 11/3034; G06F 11/3409; G11B 20/1217; G11B 2020/1238
See application file for complete search history.

(56) References Cited

U.S. PATENT DOCUMENTS

| 2018/0314440 A1 | 11/2018 | Abe et al. | |
| 2021/0182166 A1* | 6/2021 | Hahn | G06F 11/3034 |
| 2022/0013145 A1* | 1/2022 | Ren | G06F 3/0608 |

FOREIGN PATENT DOCUMENTS

JP 2018-190055 A 11/2018

OTHER PUBLICATIONS

Performance Evaluation of Host Aware Shingled Magnetic Recording (HA-SMR) Drives, IEEE, 2017, pp. 1-14 (Year: 2017).*

* cited by examiner

Primary Examiner — Arvind Talukdar
(74) Attorney, Agent, or Firm — XSENSUS LLP

(57) ABSTRACT

A storage device includes a plurality of memory devices, and processing circuitry. The plurality of memory devices includes one or more hard disk drives. The processing circuitry is configured to inspect performance of the one or more hard disk drives at a predetermined timing; perform a first predetermined countermeasure processing, on a target hard disk drive out of the one or more hard disk drives whose performance has been determined to have fallen, in a case that the target hard disk drive is a shingled magnetic recording hard disk drive; and perform a second predetermined countermeasure processing, different from the first predetermined countermeasure processing, on the target hard disk drive, in a case that the target hard disk drive is not a shingled magnetic recording hard disk drive.

9 Claims, 3 Drawing Sheets

STORAGE SYSTEM AND DEVICE TO MONITOR PERFORMANCE AND APPLY COUNTERMEASURES TO SMR AND NON-SMR DRIVES

CROSS-REFERENCE TO RELATED APPLICATION

This application is based on and claims priority under 35 USC § 119 from Japanese Patent Application No. 2021-151527, filed on Sep. 16, 2021, the entire contents of which are incorporated herein by reference.

TECHNICAL FIELD

The present disclosure relates to a storage device, a storage system, and a control method.

BACKGROUND

As for a shingled magnetic recording (SMR) hard disk drive (hereinafter, referred to as an HDD), when a usage rate of its internal cache reaches a certain value (for example, 80%; it may differ according to the HDD) and even when the HDD is not out of order, a data read/write rate (hereinafter, referred to as a data transfer rate) may decline.

Meanwhile, some controllers of a network-attached storage (NAS) or the like monitor a data transfer rate of an HDD provided in the NAS to determine that the HDD is out of order when the data transfer rate has fallen below a predetermined threshold value. Conventionally, an average response time and the like are calculated from a record of response times for access requests to data in a storage unit, such as an HDD, to determine that performance of the storage unit has fallen.

SUMMARY

A storage device in accordance with the present disclosure includes a plurality of memory devices, and processing circuitry. The plurality of memory devices includes one or more hard disk drives. The processing circuitry is configured to inspect performance of the one or more hard disk drives at a predetermined timing; perform a first predetermined countermeasure processing, on a target hard disk drive out of the one or more hard disk drives whose performance has been determined to have fallen, in a case that the target hard disk drive is a shingled magnetic recording hard disk drive; and perform a second predetermined countermeasure processing, different from the first predetermined countermeasure processing, on the target hard disk drive, in a case that the target hard disk drive is not a shingled magnetic recording hard disk drive.

BRIEF DESCRIPTION OF DRAWINGS

Exemplary embodiments of the present disclosure will be described in detail based on the following figures, wherein.

DETAILED DESCRIPTION OF THE DRAWINGS

The inventors of the present disclosure have recognized that, if an SMR HDD is used in a NAS with such a controller and even if the HDD is not out of order, the controller may mis-determine that the HDD is out of order based on a fall in a data transfer rate caused by a rise in a usage rate of an internal cache of the HDD. Further, if the controller of the NAS can acquire the usage rate of the internal cache, such mis-determination may be checked by referring to the usage rate. However, the inventors have recognized that controllers of NASes cannot refer to the usage rate since they do not have a means of acquiring it.

The inventors have developed the technology of the present disclosure in order to provide a storage device, a storage system, and a control method in which, even if usage rates of internal caches of HDDs cannot be acquired, it is possible to check mis-determination that an SMR HDD is out of order based on a fall in a data transfer rate caused by a rise in a usage rate of an internal cache of the SMR HDD.

Figure 1:
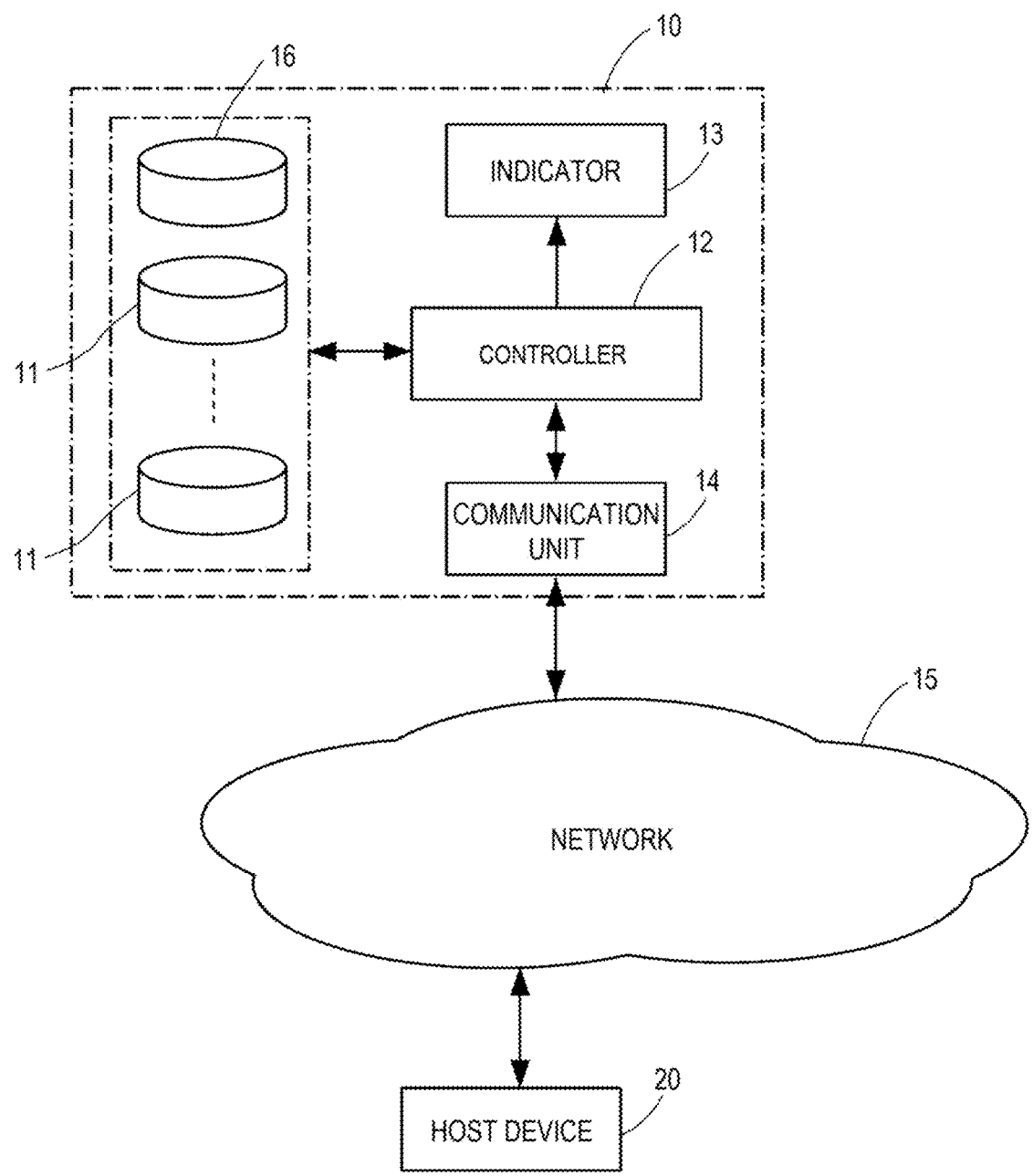
FIG. 1 is a block diagram showing a configuration example of a storage device and a host device.

Embodiments of the present disclosure will be described with reference to the drawings. As shown in FIG. 1, a storage device 10 includes a plurality of memory devices, such as a plurality of HDDs 11 each of which is a storage unit. Alternatively, the storage device 10 includes a plurality of memory devices, such as one or more HDDs 11 and one or more solid-state drives (SSD) 16. Each of the HDDs 11 may be a shingled magnetic recording (SMR) or conventional magnetic recording (CMR) HDD, and both may be combined in the HDDs 11. The storage device 10 further includes a controller 12, an indicator 13 and a communication unit 14. The storage device 10 is connected to a host device 20 via a network 15 or a serial interface such as Universal Serial Bus (USB). For example, the storage device 10 is a NAS in a redundant array of inexpensive disks (RAID) configuration, and the host device 20 is a personal computer.

In an exemplary implementation of the present disclosure, the functionality of controller 12, indicator 13 and/or communication unit 14 may be implemented using circuitry or processing circuitry that includes general-purpose processors, special-purpose processors, integrated circuits, application-specific integrated circuits (ASICs), conventional circuitry, and/or combinations thereof that are configured or programmed to perform the disclosed functionality. Processors are considered circuitry or processing circuitry as they include transistors and other circuitry therein. In the present disclosure, the circuitry, units, or means are hardware that carry out or are programmed to perform the recited functionality. The hardware may be any hardware disclosed herein or otherwise known that is programmed or configured to carry out the recited functionality. When the hardware is a processor that may be considered a type of circuitry, the circuitry, units, or means are a combination of hardware and software, the software being used to configure the hardware and/or processor.

The controller 12 may further includes a program control unit, and a memory unit, such as a memory. The memory unit is nonvolatile at least in part. The controller 12 is configured to perform predetermined processing according to a program stored in the nonvolatile memory unit. The memory unit is configured to function as a working memory of the controller 12. The program stored in the memory unit may be stored in a non-transitory computer-readable medium.

The controller 12 is configured to transfer data to and from the host device 20 via the communication unit 14. The controller 12 is also configured to perform general data processing as a storage device, such as data reading and data writing, in accordance with instructions from the host device 20.

The controller 12 may be configured to function as a RAID controller. In this case, when a predetermined condition is satisfied, for example, when the controller 12 determines that one of the HDDs 11 is out of order, the controller 12 performs processing (shift processing to a so-called degraded mode) of suspending use of at least some of the HDDs 11 to disconnect them, warning processing, and the like.

Characteristically, in the present embodiment, the controller 12 executes performance inspection processing for each of the HDDs 11 at a predetermined timing and performs predetermined countermeasure processing when the controller 12 determines, based on results of the performance inspection processing, that performance of some of the HDDs 11 has fallen. In the countermeasure processing, the controller 12 selectively performs different countermeasure processing depending on whether an HDD 11 (referred to as a target HDD) whose performance has been determined to have fallen is an SMR HDD or not. An example of specific operation of the controller 12 will be described later.

Figure 2:
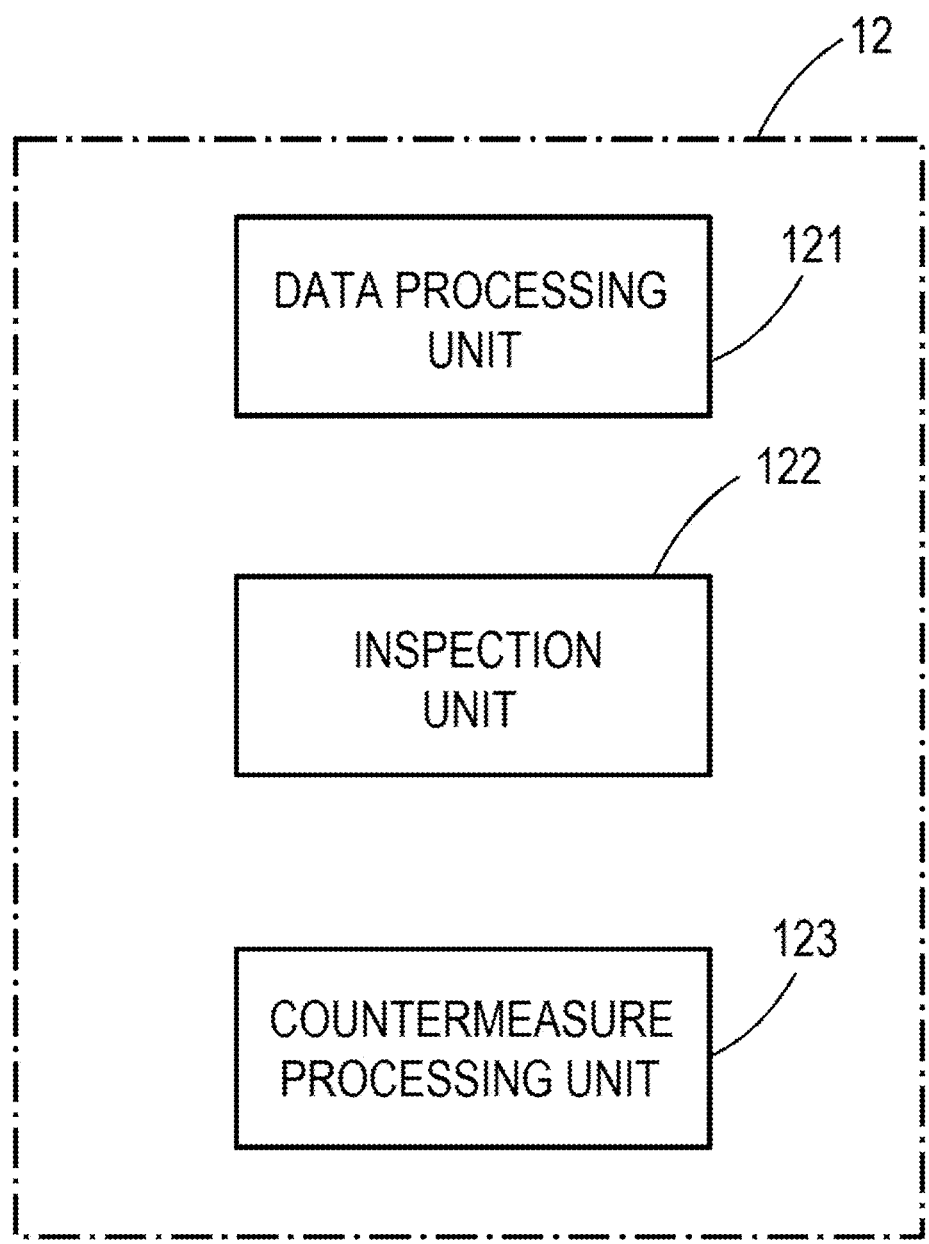
FIG. 2 is a function block diagram showing a configuration example of a controller of the storage device.

The indicator 13 may include a light-emitting diode (LED) or the like and is configured to present information in accordance with instructions from the controller 12. The communication unit 14 is configured to receive data writing instructions from the host device 20 via the network 15 or the serial interface, and transmit them to the controller 12. The communication unit 14 is also configured to receive data reading instructions from the host device 20 and transmit them to the controller 12 and to transmit data output from the controller 12 in response to them to the host device 20. In an exemplary implementation, the communication unit 14 may include a transmitter, receiver, transceiver or other communication circuitry in order to transmit and receive data to controller 12, host device 20 and/or other component or device. Next, an operation example of the controller 12 will be described. As shown in FIG. 2, processing circuitry of the controller 12 may be configured to functionally include a data processing unit 121, an inspection unit 122 and a countermeasure processing unit 123.

The data processing unit 121 is configured to receive instructions from the host device 20 via the communication unit 14 and perform data reading from or data writing to the HDDs 11 or perform the like.

The inspection unit 122 is configured to work at a predetermined timing, such as when the storage device 10 boots, to inspect the HDDs 11. The inspection unit 122 inspects each of the plurality of storage units, such as HDDs 11.

The inspection unit 122 is configured to acquire a data transfer rate of an HDD 11 to execute performance inspection processing. Specifically, the data transfer rate can be calculated similarly to a device read rate provided by hdparm command, which is widely used in such operating systems as Linux. When the acquired data transfer rate is below a predetermined threshold value, the inspection unit 122 determines that performance of the inspected HDD 11 has fallen and transmit information specifying the inspected HDD 11 to the countermeasure processing unit 123.

The inspection unit 122 may be configured to determine whether the performance of the inspected HDD 11 has fallen or not based on results of a plurality of executions of the performance inspection processing instead of one execution of the processing.

For example: when the data transfer rate of the HDD 11 is below the predetermined threshold value, the inspection unit 122 may execute second performance inspection processing for the HDD 11; when the data transfer rate of the HDD 11 is below the predetermined threshold value even in the second performance inspection processing, the inspection unit 122 may execute third performance inspection processing for the HDD 11; and when the data transfer rate of the HDD 11 is below the predetermined threshold value even in the third performance inspection processing, the inspection unit 122 may determine that the performance of the HDD 11 has fallen. In this case, when the data transfer rate is not below the predetermined threshold value once during the performance inspection processing, which can be executed three times at the most, it is not determined that the performance of the HDD 11 has fallen.

The countermeasure processing unit 123 is configured to receive, from the inspection unit 122, the information specifying the HDD 11 (target HDD) whose performance has been determined to have fallen and perform the countermeasure processing.

The countermeasure processing unit 123 is configured to determine whether the target HDD is an SMR HDD or not. When it is determined that the target HDD is an SMR HDD, the countermeasure processing unit 123 performs notification processing (hereinafter, referred to as SMR notification processing for the sake of distinction) of notifying that the performance of the target HDD has fallen. When it is determined that the target HDD is not an SMR HDD, the countermeasure processing unit 123 performs shift processing of the target HDD to a degraded mode to be described later. The SMR notification processing may be performed, for example, by turning on or blinking the LED of the indicator 13 in a predetermined manner. When it is determined that the target HDD is not an SMR HDD, the general data processing as a storage device may be performed without performing the shift processing or the notification processing.

It may be determined whether the target HDD is an SMR HDD or not based on a model number of the storage device 10. Specifically, a list of model numbers of a storage device 10 including an SMR HDD may be stored in advance in the memory unit of the controller 12. The countermeasure processing unit 123 may acquire the model number of the storage device 10 (which may be also stored in advance in the memory unit) that includes the countermeasure processing unit 123 to determine whether the target HDD is an SMR HDD or not by confirming whether the acquired model number is included in the list or not. However, the method of determining whether the target HDD is an SMR HDD or not is not limited thereto.

For example, the countermeasure processing unit 123 may acquire the model number of the storage device 10 that includes the countermeasure processing unit 123 to determine whether the target HDD is an SMR HDD or not by confirming whether the acquired model number matches a model number pattern given to a storage device 10 including an SMR HDD (for example, whether the acquired model number begins with "SMR" or not if a storage device 10 including an SMR HDD is given a model number beginning with "SMR").

Alternatively, a flag indicating whether the HDD 11 included in the storage device 10 is an SMR HDD or not may be stored in advance in the memory unit. In this case, the countermeasure processing unit 123 refers to the flag to determine whether the HDD 11 is an SMR HDD or not.

Alternatively, it may be determined whether the HDD 11 is an SMR HDD or not based on identification information of the HDD 11 acquired from hdparm command or the like.

When the countermeasure processing unit 123 determines that the target HDD is not an SMR HDD, the countermeasure processing unit 123 suspends use of the target HDD to begin a so-called degraded mode. The countermeasure processing unit 123 may be configured to perform notification of the degraded mode by turning on or blinking the LED of the indicator 13 in a predetermined manner. In this case, the manner of the notification should be distinguishable from that of the SMR notification.

Operation

Figure 3:
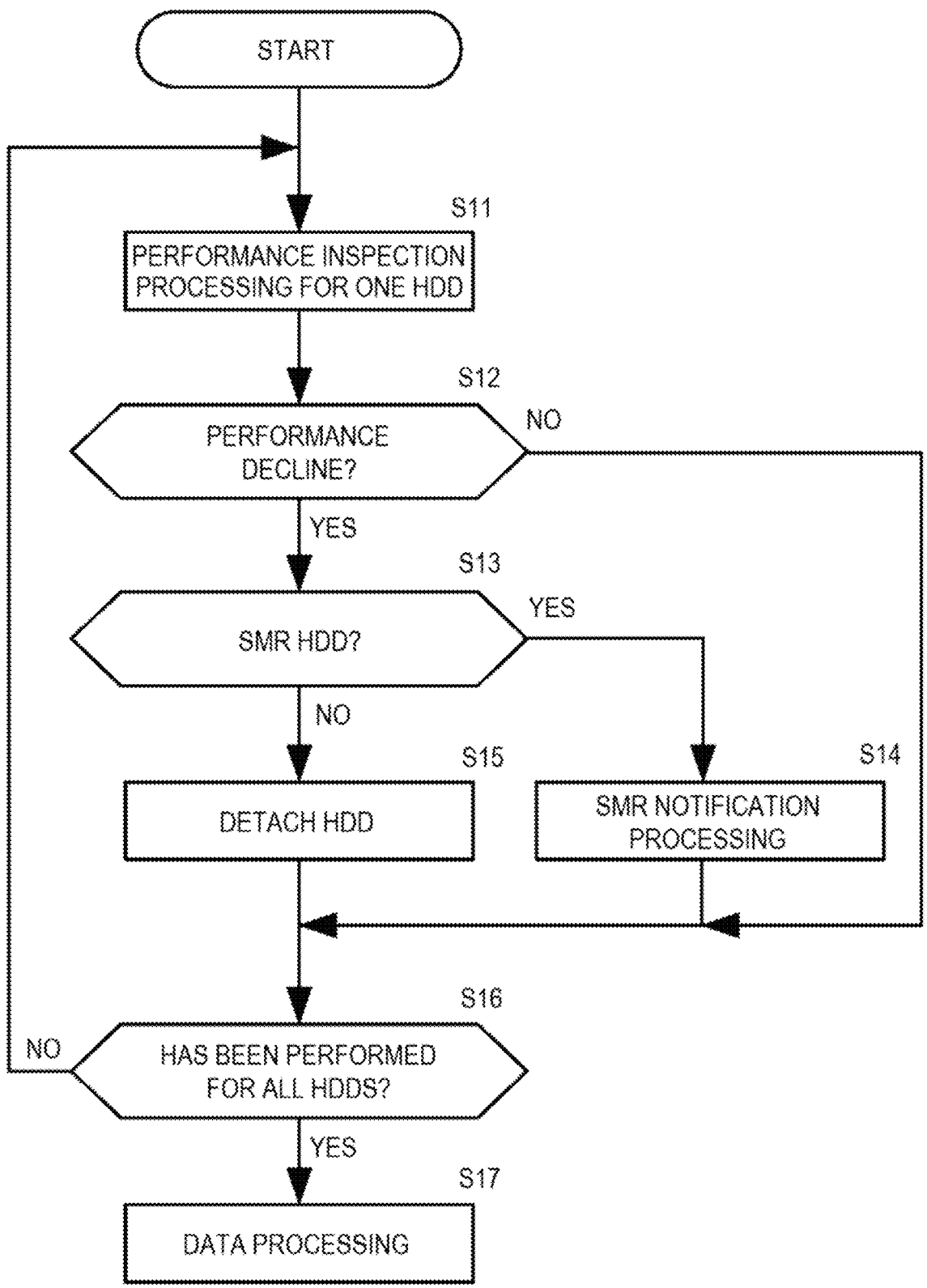
FIG. 3 is a flowchart showing an operation example of the storage device.

Operation of the storage device 10 will be described in the following as an example. As shown in FIG. 3, when the storage device 10 boots, the storage device 10 executes performance inspection processing for each of the HDDs 11 in the storage device 10 (S11).

In the performance inspection processing, when the acquired data transfer rate is below the predetermined threshold value, the storage device 10 retries acquiring the data transfer rate such that the rate is acquired a predetermined number of times (for example, three times) at the most. If the data transfer rate is over the predetermined threshold even once, the storage device 10 determines that performance of the inspected HDD 11 has not fallen. If the data transfer rate is below the predetermined threshold every time, the storage device 10 determines that the performance has fallen.

When the storage device 10 determines that the performance of the inspected HDD 11 has fallen (S12: Yes), the storage device 10 determines whether the inspected HDD 11 (target HDD) is an SMR HDD or not (S13).

For example, when the model number of the storage device 10 is included in a list that lists model numbers of products including an SMR HDD, it is determined that the target HDD is SMR HDD.

When the storage device 10 determines that the target HDD is an SMR HDD (S13: Yes), the storage device 10 performs the SMR notification processing by turning on or blinking the LED of the indicator 13 in a predetermined manner (for example, by blinking the LED in yellow) (S14).

On the other hand, if it is determined in step S13 that the target HDD is not an SMR HDD (S13: No), the storage device 10 suspends use of the target HDD to begin the so-called degraded mode (S15). In this case, the storage device 10 may perform the notification of the degraded mode by turning on or blinking the LED in a manner different from the manner of the SMR notification in step S14 (for example, by turning on the LED in red).

The storage device 10 repeats steps S11 to S15 for each of the HDDs 11. If steps S11 to S15 have not been performed for each of the HDDs 11 (NO at S16), the storage device 10 returns back to step S11. If steps S11 to S15 have been performed for each of the HDDs 11 (YES at S16), the boot is completed. After that, the storage device 10 receives instructions from the host device 20 via the communication unit 14 and performs the general data processing as a storage device, such as data reading from and data writing to the HDDs 11 (S17).

As described above, according to the present embodiment, when it is determined that performance of an HDD has fallen, it is determined whether the HDD is an SMR HDD or not. When the HDD whose performance has been determined to have fallen is an SMR HDD, it is possible to notify the user that the performance of the HDD has fallen without shifting to the degraded mode.

Another Example of SMR Notification

The SMR notification may not be performed by blinking the LED of the indicator 13 or the like. For example, in the SMR notification processing in step S14 if the indicator 13 is configured with a display that is configured to display characters, the controller 12 of the storage device 10 may advise a user to wait for a predetermined period of time with the SMR HDD 11 kept energized.

The predetermined period of time may be experimentally determined in advance such that it takes the predetermined period of time a usage rate of an internal cache of the SMR HDD 11 to decline by a predetermined ratio with the SMR HDD 11 kept energized without data being written to the SMR HDD 11.

In the SMR notification processing in step S14, the controller 12 may request the host device 20 to perform the SMR notification processing to indicate that the performance of the SMR HDD 11 has fallen and/or that the user should wait for the predetermined period of time with the SMR HDD 11 kept energized.

In this case, the host device 20 receives the request for the SMR notification processing and performs the SMR notification processing by displaying a message or the like for the user that reads, "the performance of the SMR HDD 11 has fallen" and/or "please wait for * seconds with the SMR HDD 11** kept energized."

The message of the SMR notification may present specific countermeasures, such as "please leave the SMR HDD 11 without data being written to it for a while and reboot it."

After the predetermined period of time has passed since the SMR notification processing in step S14, the storage device may execute the performance inspection processing in step S11 again to determine whether the performance of the SMR HDD 11 has improved or not. When it is determined again that the performance of the HDD 11 has fallen, it may be determined that the HDD 11 is out of order and perform a countermeasure processing (step S15) similar to a case of a CMR HDD.

Record of Performance Decline

In addition to the SMR notification processing, storage device 10 may record information about performance decline (hereinafter, referred to as performance decline information) of the SMR HDD 11 in the nonvolatile memory unit of the controller 12.

The performance decline information may include a date and time when the information was recorded. The date and time may be acquired from a real time clock/calendar circuit or the like if the storage device 10 includes such a circuit, or from another source that may supply the date and time. The date and time may also be acquired from the host device 20 or a time server via a network.

When the date and time was recorded in this manner and a predetermined period of time has passed since the date and time, the storage device 10 may perform a notification processing. The notification processing may be performed by turning on or blinking the LED of the indicator 13 or by requesting the host device 20 to display information. The predetermined period of time may be experimentally determined in advance such that it takes at least the predetermined period of time a usage rate of an internal cache of an SMR HDD 11 to decline by a predetermined ratio (for example, 20%) with the SMR HDD 11 kept energized without data being written to the SMR HDD 11.

The performance decline may be recorded in the host device 20. In this case, the host device 20 records the performance decline information when it receives, from the storage device 10, information (such as a request for the SMR notification processing) indicating that the performance of the SMR HDD 11 has been determined to have fallen. Also in this case, the performance decline information may include the date and time when the performance decline information is recorded.

In such a case, the host device 20 may perform the notification processing for the user when the predetermined period of time has passed since the date and time. In this case, data writing to the storage device 10 in accordance with the user's instructions may be forbidden until the notification processing is performed. For example, when the host device 20 receives the user's instructions to write data after the performance decline information was recorded and before the predetermined period of time has passed, the host device 20 displays a message for the users that reads, "the performance of the HDD has fallen" and forbids the data writing.

Although the storage device 10 includes the plurality of HDDs in the foregoing, the present disclosure is not limited thereto as long as the storage device 10 includes a plurality of storage units. For example, the storage device 10 may include: one HDD; and one or more SSDs.

Another Configuration Example

Although the functionality of the inspection unit 122 and the countermeasure processing unit 123 are implemented by the controller 12 of the storage device 10 in the foregoing, the present embodiment is not limited thereto.

For example, the host apparatus 20 may implement the functionality. In this case, a program for causing the host device 20 to operate as the inspection unit 122 and the countermeasure processing unit 123 is installed in the host device 20.

The host apparatus 20 inspect the performance of the HDD 11 out of storage units (regardless of whether they are housed in a case of the host device 20 or are included in the storage device 10 externally attached to the host device 20) connected to the host device 20 at a predetermined timing (for example, when the storage device 10 boots). In the following, the host device 20 is connected to the storage device 10 including one or more HDDs 11.

Also in this case, the host device 20 as the inspection unit 122 acquires the data transfer rate of each of the HDDs 11 from hdparm command or the like to execute the performance inspection processing. When the acquired data transfer rate is below the predetermined threshold value, the host device 20 determines that the performance of the HDD 11 has fallen.

The host device 20 may determine whether the performance of the inspected HDD 11 has fallen or not based on results of a plurality of executions of performance inspection processing instead of one execution of performance inspection processing similarly to the controller 12 as the inspection unit 122.

That is: when the data transfer rate of the HDD 11 is below the predetermined threshold value, the host device 20 may execute second performance inspection processing for the HDD 11; when the data transfer rate of the HDD 11 is below the predetermined threshold value even in the second performance inspection processing, the host device 20 may execute third performance inspection processing for the HDD 11; and when the data transfer rate of the HDD 11 is below the predetermined threshold value even in the third performance inspection processing, the host device 20 may determine that the performance of the HDD 11 has fallen. In this case, when the data transfer rate is not below the predetermined threshold value once during the performance inspection processing, which can be executed three times at the most, it is not determined that the performance of the HDD 11 has fallen.

When the host device 20 determines that the performance of some of the HDDs 11 of the storage device 10 has fallen, the host device 20 as the countermeasure processing unit 123 determines whether the HDD 11 (referred to as a target HDD) whose performance has been determined to have fallen is an SMR HDD or not. It may be determined whether the target HDD is an SMR HDD or not based on the model number or the like of the storage device 10 similarly to the controller 12 as the countermeasure processing unit 123. In addition, the host device 20 may determine whether each of the storage units is an SMR HDD or not based on a model number or the like of storage disk unit.

For example, the host device 20 may refer to the model number of the storage device 10 (hence, it is assumed that the storage device 10 is configured to transmit its model number to the host device 20 in response to an inquiry) to determine whether the model number is one given to a storage device 10 including an SMR HDD based on a list or predetermined patterns or not and to determine whether the target HDD is an SMR HDD or not.

If the target HDD is an SMR HDD, the host device 20 notifies the user that the performance of the target HDD has fallen (SMR notification processing). For example, the host device 20 turns on or blinks the LED of the indicator 13 of the storage device 10 in a predetermined manner. The host device 20 may display a message indicating that the performance of the target HDD has fallen and/or that the user should wait for a predetermined period of time with the target HDD of the storage device 10 kept energized.

The predetermined period of time may be experimentally determined in advance such that it takes the predetermined period of time a usage rate of an internal cache of the SMR HDD 11 to decline by a predetermined ratio with the SMR HDD 11 kept energized without data being written to the SMR HDD 11.

On the other hand, if the host device 20 determines that the target HDD is not an SMR HDD, the host device 20 suspends use of the target HDD and if there is another storage unit, the host device 20 instructs the storage device 10 to begin the so-called degraded mode. In this case, the host device 20 may perform a notification of the degraded mode by turning on or blinking the LED of the indicator 13 of the storage device 10 in a predetermined manner. The manner of this notification should be distinguishable by the user from that of the SMR notification.

The storage device according to the present disclosure includes: a plurality of storage units including one or more hard disk drives; and a processing circuitry, in which the processing circuitry is configured to: inspect performance of the hard disk drives at a predetermined timing; and perform different predetermined countermeasure processing depending on whether a target hard disk drive out of the hard disk drives whose performance has been determined to have fallen based on results of inspection is a shingled magnetic recording hard disk drive or not.

By performing the countermeasure processing for a shingled magnetic recording hard disk drive different from that for other hard disk drives, it is possible to check mis-determination that the shingled magnetic recording hard disk drive is out of order based on a fall in a data transfer rate caused by a rise in a usage rate of an internal cache in the shingled magnetic recording hard disk drive.

In a case where the target hard disk drive is a shingled magnetic recording hard disk drive, the processing circuitry may perform notification processing of performance decline of the target hard disk drive.

A user can thereby recognize that the performance of the singled magnetic recording hard disk drive has fallen.

The processing circuitry may advise, in the notification processing, a user to wait for a period of time experimentally determined in advance such that it takes the period of time a usage rate of an internal cache of the shingled magnetic recording hard disk drive to decline by a predetermined ratio with the shingled magnetic recording hard disk drive kept energized without data being written to the shingled magnetic recording hard disk drive.

According to the present disclosure, it is possible to check mis-determination that a shingled magnetic recording hard disk drive is out of order based on a fall in a data transfer rate caused by a rise in a usage rate of an internal cache of the hard disk drive.

The invention claimed is:

1. A storage device, comprising:
   a plurality of memory devices including one or more hard disk drives; and
   processing circuitry configured to:
      inspect performance of the one or more hard disk drives at a predetermined timing;
      determine whether a target hard disk drive, of the one or more hard disk drives and whose performance has been determined to have fallen, is a shingled magnetic recording (SMR) hard disk drive or not;
      perform a first predetermined countermeasure processing on the target hard disk drive in a case that the target hard disk drive is determined to be a SMR hard disk drive; and
      perform a second predetermined countermeasure processing on the target hard disk drive in a case that the target hard disk drive is not determined to be a SMR hard disk drive, wherein
   the second predetermined countermeasure processing is different from the first predetermined countermeasure processing, and
   the second predetermined countermeasure processing includes suspending use of the target hard disk drive that is not determined to be a SMR hard disk.

2. The storage device according to claim 1, wherein the processing circuitry is further configured to:
   repeatedly inspect the performance of the target hard disk drive until the processing circuitry determines that the performance of the target hard disk drive has not fallen or until a number of inspections reaches a predetermined number; and
   not perform predetermined countermeasure processing in a case that the processing circuitry determines that the performance of the target hard disk drive has not fallen.

3. The storage device according to claim 1, wherein in the case that the target hard disk drive is the SMR hard disk drive, the processing circuitry is further configured to perform a notification processing of performance decline of the target hard disk drive.

4. The storage device according to claim 3, wherein the processing circuitry is further configured to advise, in the notification processing, a user to wait for a period of time such that a usage rate of an internal cache of the SMR type hard disk drive declines by a predetermined ratio with the SMR type hard disk drive kept energized without data being written to the SMR hard disk drive.

5. The storage device according to claim 4, wherein the processing circuitry is further configured to:
   reinspect the performance of the target hard disk drive after the period of time has passed since the notification processing; and
   in a case that the performance of the target hard disk drive has fallen based on results of reinspection, perform the second predetermined countermeasure processing.

6. A storage system, comprising:
   a storage device including a plurality of memory devices, the plurality of memory devices including one or more hard disk drives; and
   a host device including processing circuitry configured to:
      acquire information about performance of the one or more hard disk drives from the storage device at a predetermined timing;
      determine whether a target hard disk drive, of the one or more hard disk drives and whose performance has been determined to have fallen, is a shingled magnetic recording (SMR) hard disk drive or not;
      perform a first predetermined countermeasure processing on the target hard disk drive in a case that the target hard disk drive is determined to be a SMR hard disk drive; and
   perform a second predetermined countermeasure processing on the target hard disk drive in a case that the target hard disk drive is not determined to be a SMR hard disk drive, wherein
   the second predetermined countermeasure processing is different from the first predetermined countermeasure processing, and
   the second predetermined countermeasure processing includes suspending use of the target hard disk drive that is not determined to be a SMR hard disk.

7. A control method of a storage device using a computer connected to a plurality of memory devices which include one or more hard disk drives, the control method comprising:
   inspecting performance of the one or more hard disk drives at a predetermined timing;
   determining whether a target hard disk drive, of the one or more hard disk drives and whose performance has been determined to have fallen, is a shingled magnetic recording (SMR) hard disk drive or not;
   performing a first predetermined countermeasure processing on the target hard disk drive in a case that the target hard disk drive is determined to be a SMR hard disk drive; and
   performing a second predetermined countermeasure processing on the target hard disk drive in a case that the target hard disk drive is not determined to be a SMR hard disk drive, wherein
   the second predetermined countermeasure processing is different from the first predetermined countermeasure processing, and
   the second predetermined countermeasure processing includes suspending use of the target hard disk drive that is not determined to be a SMR hard disk.

8. A non-transitory computer-readable medium having recorded thereon a program that causes a computer to execute the control method of the storage device according to claim 7.

9. The storage device according to claim 1, wherein the second predetermined countermeasure processing includes disconnection of the target hard disk drive that is not determined to be a SMR hard disk.

\* \* \* \* \*